No. 780,534. PATENTED JAN. 24, 1905.
P. D. SOMERVILLE.
TRAY AND TURNER FOR INCUBATORS.
APPLICATION FILED APR. 25, 1904.
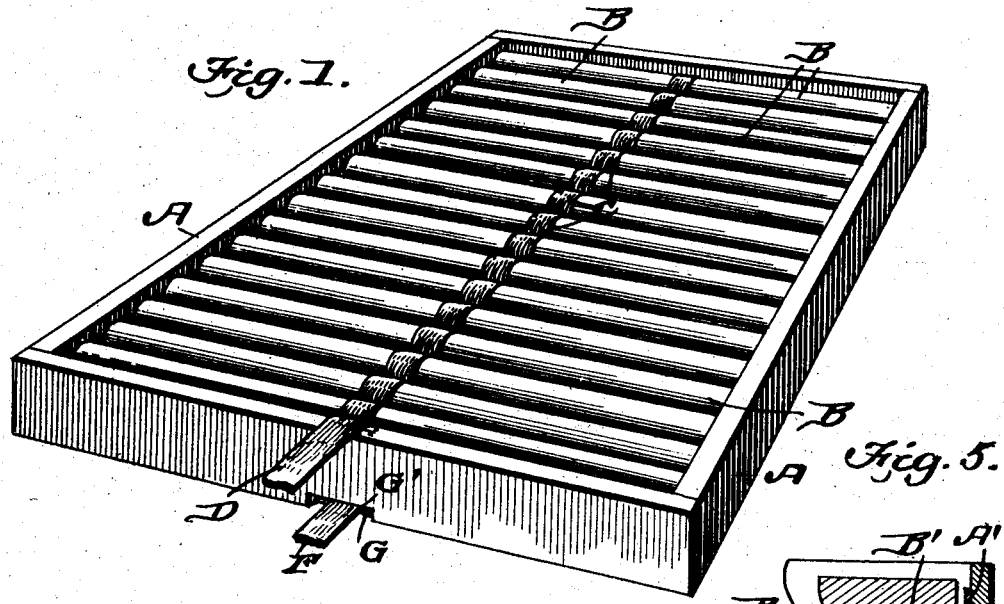
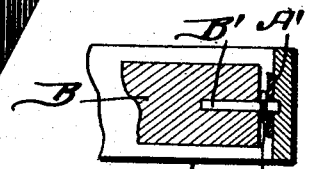
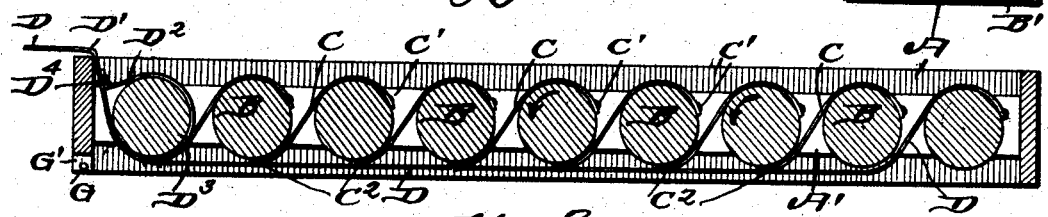
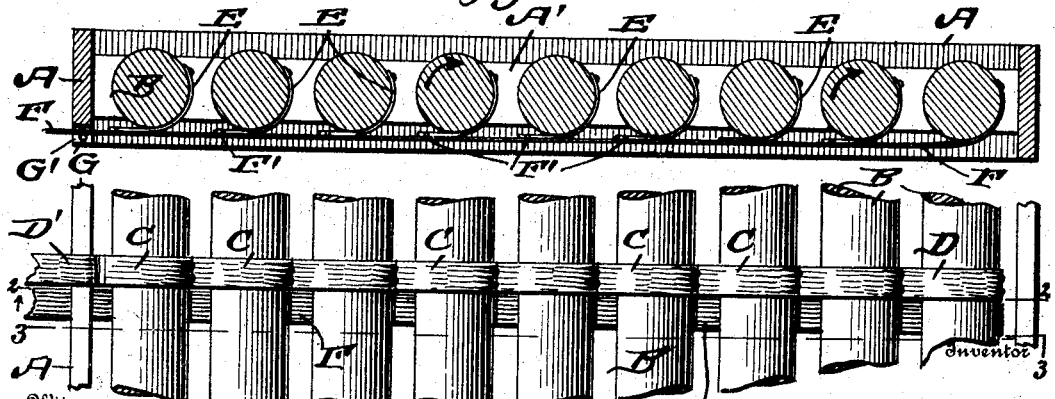
Inventor
P. D. Somerville No. 780,534. Patented January 24, 1905.

UNITED STATES PATENT OFFICE.

PERCY DOUGLAS SOMERVILLE, OF DETROIT, MICHIGAN.

TRAY AND TURNER FOR INCUBATORS.

SPECIFICATION forming part of Letters Patent No. 780,534, dated January 24, 1905.

Application filed April 25, 1904. Serial No. 204,842.

*To all whom it may concern:*

Be it known that I, PERCY DOUGLAS SOMERVILLE, a citizen of the United States, residing at Detroit, in the county of Wayne and State of Michigan, have invented a new and useful Tray and Turner for Incubators, of which the following is a specification.

This invention relates generally to incubators, and more particularly to a tray for holding the eggs within the incubator, the object of the invention being to provide an egg-holding tray of such construction that all of the eggs held by the said tray can be simultaneously turned by the manipulation of a tape, thereby avoiding the necessity of removing the tray and turning the eggs singly.

With this object in view my invention consists in constructing a tray comprising a frame and a series of rollers arranged therein and upon which the eggs are held, said rollers having tapes connected thereto and extending around the same in opposite directions, whereby the rollers can be turned in opposite directions for the purpose of turning the egg held in the tray.

The invention consists also in certain details of construction hereinafter fully described, and pointed out in the claims.

In the drawings forming a part of this specification, Figure 1 is a perspective view showing a tray constructed in accordance with my invention. Fig. 2 is a vertical longitudinal sectional view on the line 2 2 of Fig. 4. Fig. 3 is a vertical longitudinal sectional view on the line 3 3 of Fig. 4. Fig. 4 is a partial top plan view, and Fig. 5 is a detail sectional view showing the manner of journaling the rollers.

In carrying out my invention I employ a rectangular-shaped frame A, having a series of rollers B arranged transversely therein, pintles or journals B', carried at the ends of the rollers, being journaled in the aperture bearing-plates A', arranged upon the inner faces of the side members of the frame, suitable spacing collars or washers B' being interposed between the ends of the rollers and the bearing-plates, as most clearly shown in Fig. 5. These details, however, are not essential, as the rollers may be journaled in any suitable manner.

The rollers are so spaced that a number of eggs may rest thereon, and for the purpose of simultaneously turning all of the eggs held upon the tray I propose to simultaneously turn all of the rollers at least one-half of a revolution in one direction and then turning the said rollers the same distance in the reverse direction, and in order to accomplish this I employ a series of tapes C, which are connected to the rollers at C', said point of attachment being upon the rear side of the rollers at points above a horizontal line drawn through their centers, and the tape D, which is connected to the rearmost roller, passes around the top side of said roller, beneath the bottom side of the next adjacent roller, and then extends forwardly beneath the entire series of rollers and is carried forwardly and upwardly under the front roller and over the front end of the frame, as shown at $D'$. The tapes C are carried over the top side of the rollers to which they are attached and then downwardly and are connected to the tape D, as shown at $C^2$, said points of connection being substantially in line with the center of the next adjacent roller. A tape-section $D^2$ is connected to the front roller at $D^3$ and connects to the tape D at $D^4$. Another series of tapes E are connected to the rollers B at their rear sides upon a line above the centers of said rollers, said tapes E being attached to the rollers at substantially the same points as the tapes C, but to one side of the same, as most clearly shown in Fig. 4. The tape F, which is connected to the rearmost roller, extends down around the rear side of the roller and beneath the entire series of rollers, and the tapes E after passing around the rear lower side of the rollers is connected to the tape F at F', said point of connection being substantially in line with the forward edge of the roller. The extreme end of the tape F passes over a pin G, arranged in the recess G', produced in the bottom edge of the front of the frame. Thus it will be seen that by pulling upon the tape D the rollers are caused to turn in the direction indicated by the arrows marked upon the rollers in Fig. 2, whereas by pulling upon the tape F the rollers are caused to turn in a reverse direction, as indicated by the arrows marked upon the rollers in Fig. 3. It will also be understood that when the tape D is pulled outwardly the tape F is drawn inwardly, and vice versa, and it will also be understood that these tapes project sufficiently beyond the forward end of the tray to enable the operator to conveniently manipulate them.

Having thus fully described my invention, what I claim as new, and desire to secure by Letters Patent, is—

1. A tray of the kind described comprising a frame having a series of rollers journaled therein, each roller having two oppositely-disposed tapes connected thereto, one series of tapes extending over and around the rollers, and the other series of tapes extending under and around the rollers, each series being connected to a common tape for the purpose set forth.

2. A tray for incubators comprising a frame having a series of rollers journaled therein, each roller having two oppositely-disposed tapes connected thereto, at a point upon the rear side and above a horizontal line drawn through the center, each tape being connected to a tape extending beneath the entire series, and beyond the forward end of the tray.

3. A tray for incubators comprising a frame having a series of rollers journaled therein, each roller except the rearmost one having two oppositely-disposed short pieces of tape connected thereto at a point upon the rear side, and above a horizontal line drawn through the centers of the rollers, the rearmost roller having two oppositely-disposed pieces of tape connected thereto, upon the rear side, and at a point above the center, said tapes being of a length to extend beneath the entire series of rollers, and beyond the front side of the frame, the short sections of tapes being connected to their respective long sections of tape, and an additional short section connecting the front roller to the long tape extending over the top of the frame as set forth.

PERCY DOUGLAS SOMERVILLE.

Witnesses:
A. W. MARCUS,
GEORGE SOMERVILLE.